US006223144B1

(12) United States Patent
Barnett et al.

(10) Patent No.: US 6,223,144 B1
(45) Date of Patent: *Apr. 24, 2001

(54) METHOD AND APPARATUS FOR EVALUATING SOFTWARE PROGRAMS FOR SEMICONDUCTOR CIRCUITS

(75) Inventors: Philip Barnett, Clanfield; Andy Green, North Ants, both of (GB)

(73) Assignee: Advanced Technology Materials, Inc., Danbury, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,809

(22) Filed: Mar. 24, 1998

(51) Int. Cl.[7] ............................................... G06F 9/45
(52) U.S. Cl. .............................. 703/22; 703/14; 703/20; 703/21; 703/23
(58) Field of Search ....................... 395/500, 701; 714/47; 703/3, 13, 14, 19, 20, 21, 22, 23, 26

(56) References Cited

U.S. PATENT DOCUMENTS

| | | | |
|---|---|---|---|
| 5,103,394 | * 4/1992 | Blasciak | 714/47 |
| 5,604,895 | * 2/1997 | Raimi | 395/500.34 |
| 5,613,098 | * 3/1997 | Landau et al. | 395/500.41 |
| 5,671,352 | * 9/1997 | Subrahmaniam et al. | 714/41 |
| 5,680,584 | * 10/1997 | Herdeg et al. | 395/500.43 |
| 5,745,767 | * 4/1998 | Rosen et al. | 395/704 |

OTHER PUBLICATIONS

Ghosh et al, "A Hardware–Software Co–simulator for Embedded System Design and Debugging", IEEE Proceedings of the ASP–DAC '95/CHDL '95/VLSI '95, pp. 155–164, Sep. 1995.*

Schaming, "Hardware/Software Co–Design in the Rapid Prototyping of Application–Specific Signal Processors Methodology", IEEE Proceedings of the VHDL International Users' Forum, pp. 241–250, Oct. 1997.*

Ito et al, "A Hardware/Software Co–simulation Environment for Micro–processor Design with HDL Simulator and OS Interface", IEEE Proceedings of the ASP–DAC '97 Asia and South Pacific, pp. 377–382, Jan. 1997.*

* cited by examiner

*Primary Examiner*—Kevin J. Teska
*Assistant Examiner*—Samuel Broda
(74) *Attorney, Agent, or Firm*—Oliver A. Zitzmann; Ryan, Mason & Lewis, LLP

(57) ABSTRACT

A microcontroller software testing tool is disclosed for testing and debugging software for a semiconductor circuit. The microcontroller software testing tool includes a simulator for simulating the execution of the software program on the target semiconductor circuit and an emulator to permit emulation before the actual silicon exists. The emulator utilizes the same high definition language specification, such as VHDL models, that define the silicon during the fabrication process plus additional logic to model behavior of the emulated processor. In a simulation mode, the microcontroller software testing tool simulates the target semiconductor circuit on a general purpose computing device, by interpreting the instructions in the software using an instruction set of the target semiconductor circuit, and otherwise behaving like the target semiconductor circuit; and executes and evaluates the software on the simulated semiconductor circuit. The microcontroller software testing tool monitors the estimated time to execute the software on the semiconductor circuit. In an emulation mode, the microcontroller software testing tool utilizes a low-cost field programmable gate array programmed with a hardware description language description of the target semiconductor circuit. The microcontroller software testing tool is accessible by means of a data exchange protocol provided by the operating system. The microcontroller software testing tool preferably provides a modular configuration. The microcontroller software testing tool monitors the percentage of the code that is executed during testing.

37 Claims, 11 Drawing Sheets

SAMPLE TARGET HARDWARE MODEL DLL – 210
INSTRUCTION SET LOOK-UP TABLE

| | HEX VALUE 240 | MNEMONIC 242 | NUMBER OF BYTES IN OPERAND 244 | NUMBER OF CLOCK CYCLES TO EXECUTE 246 |
|---|---|---|---|---|
| 230 | 00 | NOP | 1 | 12 CLOCKS |
| 232 | 01 | AJMP | 2 | 24 CLOCKS |
| 234 | ⋮ | ⋮ | ⋮ | ⋮ |
| 236 | FE | MOV R6, A | 1 | 12 CLOCKS |
| 238 | FF | MOV R7, A | 1 | 12 CLOCKS |

FIG. 2C

SAMPLE TARGET HARDWARE MODEL DLL – 210

HARDWARE CHARACTERISTICS

|     | REGISTER (260) | PHYSICAL MEMORY LOCATION (262) |
|-----|----------|--------------------------|
| 250 | R0 | 0 |
| 252 | R1 | 1 |
| 254 | ⋮ | ⋮ |
| 256 | Rn | N |

|     | FEATURE (280) | CHARACTERISTIC (285) |
|-----|---------|----------------|
| 270 | PORT 1 | SERIAL PORT TIMINGS |
| 272 | INTERRUPTS | SERIAL PORT INTERRUPT, TIMER INTERRUPT,... |
| 274 | RANDOM NUMBER GENERATOR | RANGE 0-255 |
| 276 | POWER | SWITCHES OFF PARTS OF DEVICE |

FIG. 2D
SOFTWARE DEVELOPMENT ENVIRONMENT DLL DATA FILES – 220

| FILE LOCATION TABLE | |
|---|---|
| FILE | PATHNAME |
| OBJECT CODE FILE | C:\Program Files\Atmi\Examples\csample\csample.sim |
| DEBUG FILE | C:\Program Files\Atmi\Examples\csample\csample.debug |

287 — FILE ; PATHNAME — 289

| SYMBOL TABLE | | | |
|---|---|---|---|
| ACCUMULATOR............ | D ADDR | 00E0H | PREDEFINED |
| LOOP........................... | C ADDR | 0006H | |
| START.......................... | C ADDR | 0000H | |

SOURCE CODE MAPPING

| | SOURCE CODE LINE NUMBER AND MODULE | ADDRESS LOCATION |
|---|---|---|
| 290 | 6, MAIN.C | 00 |
| 291 | 12, GETNUM.C | 1E |
| ⋮ | ⋮ | ⋮ |
| 292 | 24, TEST.ASM | C2 |

**csample.sim*.4**

| Addr... | Data | | | | | | | | | | | | | | | |
|---|---|---|---|---|---|---|---|---|---|---|---|---|---|---|---|---|
| 0  | 02 | 01 | BF | 75 | 98 | 52 | 75 | 89 | 20 | 75 | 88 | 69 | 75 | 8D | F3 | 7B |
| 10 | FF | 7A | 00 | 79 | 26 | 5B | 12 | 02 | CF | 12 | 01 | 77 | 8E | 80 | F3 | 25 | 12 |
| 20 | 01 | 77 | 8E | 26 | 8F | 27 | 7B | FF | FF | 7A | 00 | 79 | 80 | 24 | 8F | 25 |
| 30 | 05 | C0 | BF | 2B | 03 | D3 | 80 | 01 | C3 | 92 | 09 | 30 | 12 | 02 | CF | 12 |
| 40 | 25 | 27 | FF | E5 | 24 | FE | 26 | FE | A3 | 0B | BE | C3 | E5 | 09 | 0C | E5 |
| 50 | E5 | 24 | 95 | 26 | 69 | 6C | 65 | 12 | 01 | 80 | 80 | 22 | 0A | 0A | 95 | 27 |
| 60 | 6F | 6D | 70 | 70 | 69 | 6F | 6F | 72 | 20 | 64 | 65 | 6D | 6F | 6E | 43 | 20 | FF |
| 70 | 61 | 74 | 69 | 6F | 6F | 6F | 20 | 70 | 72 | 6F | 67 | 72 | 61 | 6D | 6D | 63 |
|    |    |    |    |    |    |    |    |    |    |    |    |    |    | 0A | 0A | 72 |
|    |    |    |    |    |    |    |    |    |    |    |    |    |    | 0A | 0A | 00 |

Start $0    At $0    End $ffff    Map  Code  Style  Byte HL

FIG. 2G

| Address | Data | Opcode | Operand |
|---|---|---|---|
| (DPTR,ACC,PSW,PC) 0 | 0201BF | ljmp | c1BFc |
| 3 | 759852 | mov | ?_PRINTF517?BYTE+48 96,#$52 |
| 6 | 758920 | mov | ?_PRINTF517?BYTE+39 89,#$20 |
| 9 | 758869 | mov | ?\_PRINTF517?BYTE+38 88,#$69 |
| C | 758DF3 | mov | ?_PRINTF517?BYTE+3D 8D,#$F3 |
| F | 7BFF | mov | r3,#$FF |

At PC  Map Code  Fine <<  Fine >>

FIG. 2H

C complier demonstration program

Input Number ? 4

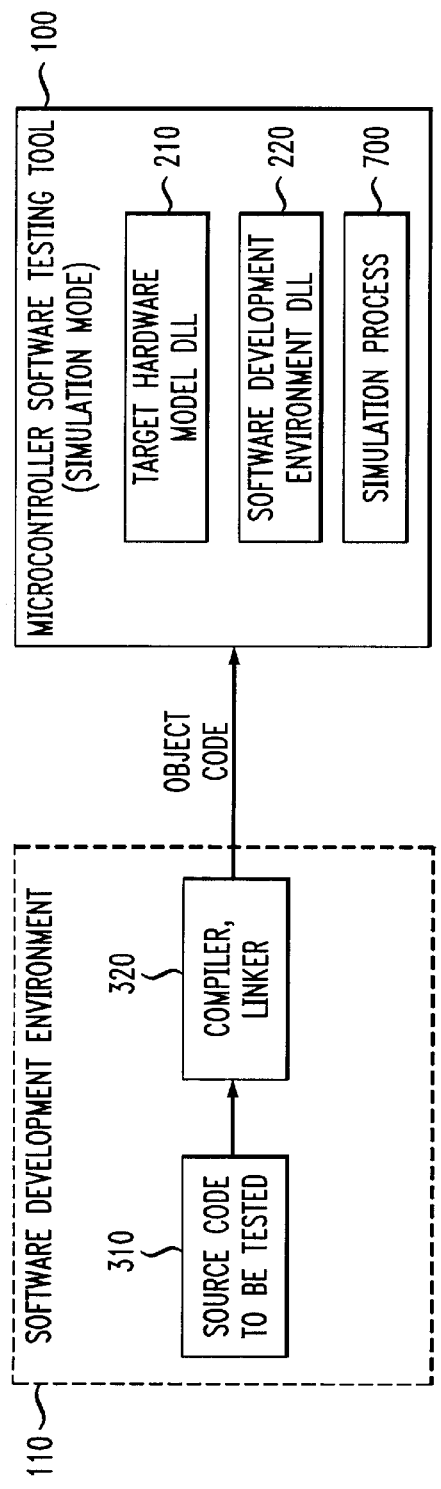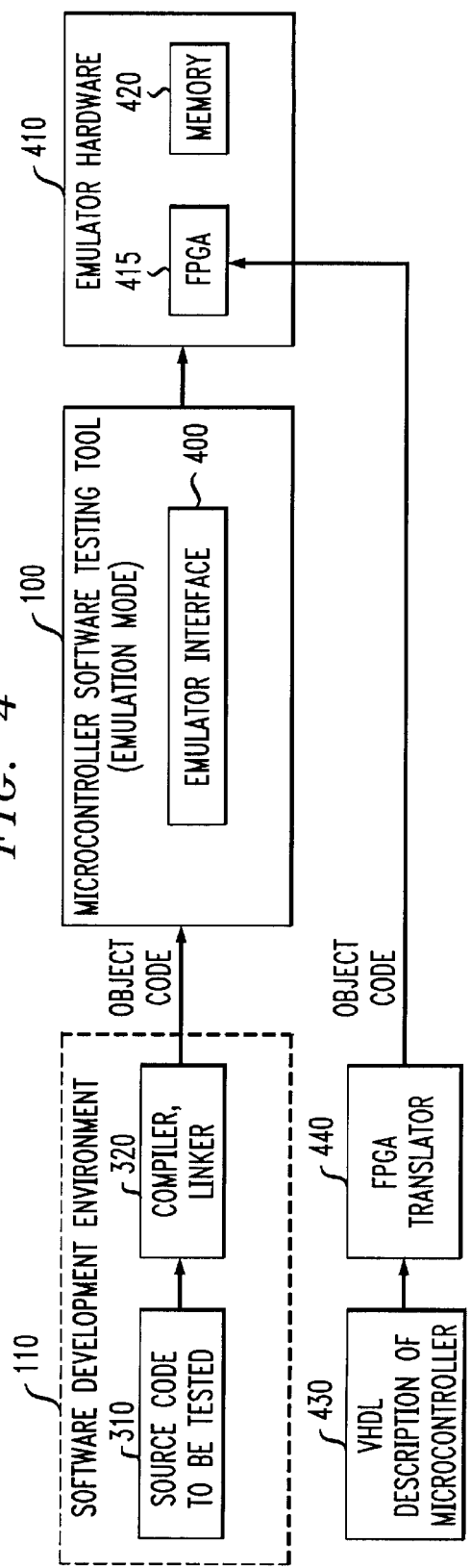

METHOD AND APPARATUS FOR EVALUATING SOFTWARE PROGRAMS FOR SEMICONDUCTOR CIRCUITS

FIELD OF THE INVENTION

The present invention relates generally to a system for testing and debugging software programs for semiconductor circuits, such as microprocessors and microcontrollers, and more particularly, to a method and apparatus for simulating and emulating microcontroller software programs.

BACKGROUND OF THE INVENTION

The design, testing and fabrication of semiconductor circuits, such as microprocessors and microcontrollers, is often an expensive and time-consuming process. Several types of computer aided design (CAD) tools have been developed or proposed to facilitate the design and fabrication of integrated circuits. Typically, computer aided design techniques initially encode the specifications of a desired integrated circuit using a hardware description language, such as the (VHSIC (Very High Speed Integrated Circuits) Hardware Description Language) (VHDL) from the Institute of Electrical and Electronics Engineers (IEEE) of New York, N.Y. or Verilog, commercially available from Cadence Design Systems, Inc. of Santa Clara, Calif. Generally, such high definition language specifications define an integrated circuit in terms of desired functionality and desired inputs and outputs. The high definition language specifications are utilized and revised throughout the design and debugging process to minimize hardware faults, and are ultimately utilized to fabricate the final silicon product.

Likewise, the software programs associated with semiconductor circuits, such as microprocessors and microcontrollers, must be similarly tested and debugged to ensure that software faults do not interfere with the operation of the semiconductor circuit. In addition, each change to an existing software program must be tested to ensure that the change does not affect the operation of the original code. In view of the high development costs associated with the semiconductor manufacturing process, it is imperative that software faults are detected and corrected early in the development cycle. Due to the high costs of fabricating special versions of a semiconductor circuit that are needed for internal access to the device, software debugging devices are costly and typically lag production of the final silicon product by a number of years. Thus, conventional testing and debugging techniques for such software programs are typically performed on simulated or emulated hardware renderings of the actual silicon device.

FIG. 1A shows a conventional development environment for testing software programs associated with a semiconductor circuit. The program to be tested is initially loaded onto a computing device 50, such as a workstation, connected to an emulator 60 and a bondout device 70. The bondout device 70 is a special version of the actual integrated circuit being designed, where additional connections are made (bonded out) to internal circuits of the device to give access and control of the device from external circuitry (not shown). The computing device 50 controls the predetermined testing of the system. The emulator 60 includes capture and control logic which monitors the contents of the program address register and the internal data bus and various control lines of the bondout device 70 and provides the captured data to the computing device 50 for analysis. The bondout device 70 is typically physically connected to the device with which the microcontroller will ultimately interface. For a more detailed discussion of a conventional development environment for testing software programs associated with a semiconductor circuit, see U.S. Pat. No. 4,674,089, incorporated by reference herein.

A unique bondout device 70 is required for each type of microprocessor that is developed. Furthermore, if the speed of operation of the microprocessor is changed or the size of the memory is modified during the development process, a new bondout device 70 is required. Thus, software for a particular microprocessor cannot be fully tested using conventional techniques until an accurate and up-to-date bondout device 70 representation of the microcontroller is available. The hardware external to the bondout device 70 rapidly becomes very complex as additional debugging features are added. Thus, a significant amount of hardware must be plugged into a target board, with resultant mechanical and electrical unreliability. The bondout device 70 itself introduces problems since it is a low volume device (one per emulator). By definition, the bondout device 70 is a more complex derivative of the volume silicon and its availability significantly lags production of the final silicon product. Any errors or undesired characteristics of this low volume part are expensive to diagnose and eradicate, typically requiring production of a new device.

When software programs are delivered to a customer, the probability that the customer will find a bug in the program is directly related to the percentage of the code that was executed during testing, often referred to as "code coverage." For example, testing of a scientific calculator program by adding "two" plus "two" ("2 +2") will not evaluate the accuracy of the floating point or trigonometric capabilities of the scientific calculator program. However, if every possibility was tested exhaustively, the customer will never find a bug. Of course, to perform a test that multiplies every possible number by every other possible number and checks the result is not a practical solution.

Generally, the test suite designed to challenge a given program should exercise as much of the program code as possible. Ideally, every byte of program code should be run, and the result checked. Furthermore, the extent of the code tested, relative to the overall code size, should be determined and reported.

Existing code coverage instrumentation techniques have a number of drawbacks, which if overcome, could extend the utility of software testing tools and the accuracy of the underlying programs tested by such tools. Specifically, existing coverage instrumentation tools typically link the program being tested to a special coverage library, thereby increasing code size, preventing execution in real-time and not testing the actual code shipped. In effect, the test results are obtained from a program that is larger, slower and potentially exhibits different behavior than the program that will be released to customers. In addition, most existing coverage instrumentation tools operate by evaluating the source code, and cannot give test results that include coverage of the library files associated with the source code, such as C Standard Libraries (for which source code is generally not available). Finally, most existing coverage instrumentation tools are poorly integrated with the source code, and issue only partial diagrams illustrating unexecuted paths, rather than directly relating the results to the source code.

In addition to the importance of diligent testing of the software, it is often equally important to record information about the tests performed, as well as the test results, for documentation, verification and authentication purposes.

Historically, the disparate and often incompatible software testing and debugging systems often made it difficult to integrate the test information into a standard documentation, verification and authentication environment. In addition, conventional software testing and debugging systems are typically stand-alone units tailored to a particular application. Thus, the lack of a standard interface prevents a user from controlling the testing and debugging processes from another application program.

As apparent from the above-described deficiencies with conventional systems for testing and debugging software for microcontrollers, a need exists for a low cost system for testing and debugging software by a programmer at compile time. A further need exists for a testing and debugging system that accurately reports the amount of time it took to execute the software program, taking into account hardware configurations and peripheral devices, to allow tuning of algorithms. Yet another need exists for a software testing and debugging system that facilitates unlimited breakpoints on any condition. Another need exists for a code coverage instrumentation tool that operates at the machine code level, does not change the program being tested, and is integrated with debugging tools to lead the user directly to relevant unexecuted source code. A further need exists for a testing and debugging system that provides a standard interface to general-purpose software applications, to permit the general-purpose applications to load, run and interrogate the software testing and debugging tool and record results in a standard document.

SUMMARY OF THE INVENTION

Generally, according to one feature of the invention, a microcontroller software testing tool is disclosed for testing and debugging a software program that will be executed on a semiconductor circuit including semiconductor circuits containing ferroelectric memory elements. The microcontroller software testing tool includes a simulator, an emulator and a number of debugging tools for editing the source code. Generally, the simulator simulates the execution of the software program on the target semiconductor circuit. The emulator allows emulation of different semiconductor devices using the same microcontroller software testing tool; permits emulation before silicon exists and utilizes the same high definition language specification, such as VHDL models, that defines the silicon during the fabrication process.

In a simulation mode, the microcontroller software testing tool simulates the target semiconductor circuit on a general purpose computing device; executes the software on the simulated semiconductor circuit; and then permits evaluation of the operation of the software. The microcontroller software testing tool interprets the instructions in the software using an instruction set of the target semiconductor circuit, and otherwise behaves like the target semiconductor circuit. In one embodiment, the microcontroller software testing tool monitors the estimated time to execute the software on the semiconductor circuit, including the time to execute each instruction as well as hardware access times.

In an emulation mode, the microcontroller software testing tool utilizes a field programmable gate array programmed with a hardware description language description of the target semiconductor circuit; and thereby permits emulation of the semiconductor circuit using the programmed field programmable gate array. In this manner, the software can be executed and evaluated on the emulated semiconductor circuit (programmed FPGA circuit).

According to another aspect of the invention, the features of the microcontroller software testing tool can be made accessible by means of a data exchange protocol provided by the operating system, such as the object linking and embedding (OLE) interface provided by Windows NT and Windows 95. The OLE interface permits data to be shared between applications and provides a programmatic interface that allows the microcontroller software testing tool and related peripherals to be (i) accessed over a local or wide area network; or to be (ii) controlled by third party programs or scripts, such as general purpose controlling programs 120. In this manner, the general purpose controlling programs can load, run and interrogate the microcontroller software testing tool and record results in a standard document. Thus, existing general-purpose office application program(s), can integrate the testing of software using the microcontroller software testing tool into documents and permit solutions created using languages that support OLE, such as Basic, Visual Basic, C, C++, Java or Delphi.

The microcontroller software testing tool preferably provides a modular configuration, consisting of a configurable core, and additional Dynamic Link Libraries (DLLs) that interface the tool to selected hardware configurations and software development environments. In this manner, the microcontroller software testing tool can support any microcontroller, or any code development suite.

In addition, the microcontroller software testing tool monitors the percentage of the code that is executed during testing. In one embodiment, the code coverage instrumentation reports and displays the code coverage, by indicating whether or not each portion of the software has been executed and tested. The microcontroller software testing tool sets a number of flags to determine the percentage of the code that was executed by the software test and to provide a visual display of the memory distinguishing data memory locations that were either read or written, from memory locations that were not accessed.

A more complete understanding of the present invention, as well as further features and advantages of the present invention, will be obtained by reference to the following detailed description and drawings.

BRIEF DESCRIPTION OF THE DRAWINGS

FIG. 2A illustrates the modularity of the microcontroller software testing tool of FIG. 1B and the multiple views that may be presented to a user of test results;

FIGS. 2B and 2C, collectively, illustrate a set of tables associated with a sample target hardware model DLL of FIG. 2A;

FIG. 2D illustrates a set of tables produced by a software development environment DLL of FIG. 2A;

FIGS. 2E through 2H, illustrate the memory, register, disassembly and terminal views of FIG. 2A;

FIG. 3 is a schematic block diagram of the microcontroller software testing tool of FIG. 1B in a simulation mode;

FIG. 4 is a schematic block diagram of the microcontroller software testing tool of FIG. 1B in an emulation mode;

DETAILED DESCRIPTION

Figure 1A:
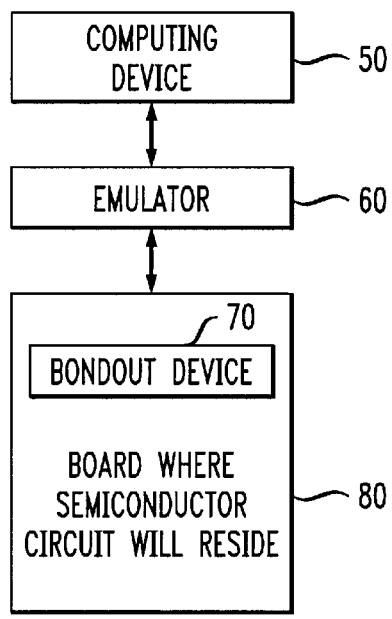
FIG. 1A is a schematic block diagram illustrating a conventional system for testing and debugging software programs for microcontrollers.
Figure 1B:
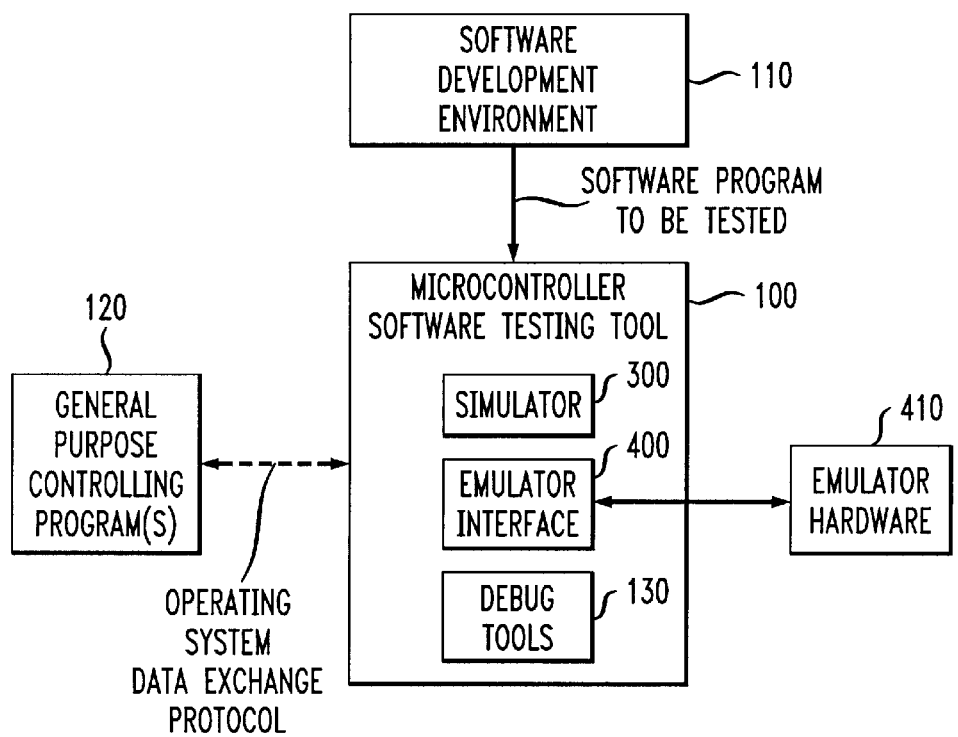
FIG. 1B is a schematic block diagram illustrating a microcontroller software testing tool, in accordance with one embodiment of the present invention.

The terms "microcontroller" and "microprocessor" are used interchangeably herein to indicate single-chip data processing circuits. FIG. 1B illustrates a microcontroller software testing tool 100 for testing and debugging a software program produced by a software development environment 110. According to a feature of the present invention, shown in FIG. 1B, all features of the microcontroller software testing tool 100 can be made accessible by means of a data exchange protocol provided by the operating system, such as the object linking and embedding (OLE) interface provided by Windows NT and Windows 95. For a more detailed discussion of Microsoft's OLE interface, see, for example, P. McFedries, Windows 95 Unleashed: Professional Reference Edition (1997), 555–77, incorporated by reference herein.

The OLE interface permits data to be shared between applications and provides a programmatic interface that allows the microcontroller software testing tool 100 and related peripherals to be (i) accessed over a local or wide area network; or to be (ii) controlled by third party programs or scripts, such as general purpose controlling programs 120. In this manner, the general purpose controlling programs 120 can load, run and interrogate the microcontroller software testing tool 100 and record results in a standard document. Typically, general-purpose controlling application program(s) 120, such as Microsoft Word or Excel, include a macro language that allows pre-recorded actions to function when required.

In addition, the OLE interface exposes programmatically all the features of the tool. Thus, existing general-purpose office application program(s) 120, such as Microsoft Word or Excel, can integrate the testing of software using the microcontroller software testing tool 100 into documents and permit solutions created using languages that support OLE, such as Basic, Visual Basic, C, C++, Java or Delphi. Furthermore, the OLE interface allows the microcontroller software testing tool 100 to be incorporated into networked, intranet or internet configurations supported by the operating system, such as Windows NT and Windows 95, allowing sharing of the microcontroller software testing tool 100 and peripheral resources to distributed users.

As shown in FIG. 1B, the microcontroller software testing tool 100 includes a simulator 300, discussed further below in conjunction with FIGS. 3, 7A and 7B, an emulator 400, discussed further below in conjunction with FIG. 4, and a number of debug tools 130 for editing the source code. As discussed further below, the simulator 300 simulates the execution of the software program on the target hardware. Thus, the microcontroller software testing tool 100 interprets the object code values and behaves like the target hardware.

As discussed further below, the emulator interface 400 provides access to the emulator hardware 410; allows emulation of different semiconductor devices using the same microcontroller software testing tool 100; permits emulation before silicon exists and utilizes the same high definition language specification, such as VHDL models, that defines the silicon during the fabrication process. Generally, the microcontroller software testing tool 100 can emulate a semiconductor circuit that has a high definition language specification available, such as a VHDL file.

According to a further feature of the invention, the microcontroller software testing tool 100 provides a modular configuration. In one embodiment, shown in FIG. 2A, the microcontroller software testing tool 100 consists of a configurable core, and additional Dynamic Link Libraries (DLLs) 210, 220 that interface the tool to selected hardware configurations and software development environments, respectively. In this manner, the microcontroller software testing tool 100 can support any microcontroller, such as Intel's 8051, or any code development suite, such as the Kiel PK51 Integrated Software Development Environment, commercially available from Ashling Microsystems of Sunnyvale, Calif.

According to a further feature of the present invention, discussed below in conjunction with FIGS. 7A and 7B, the microcontroller software testing tool 100 monitors the percentage of the code that is executed during testing. In one embodiment, the code coverage instrumentation reports and displays the code coverage, by indicating whether or not each portion of the software has been executed and tested. The microcontroller software testing tool sets a number of flags to determine the percentage of the code that was executed by the software test and to provide a visual display of the memory distinguishing data memory locations that were either read or written from memory locations that were not accessed. As previously indicated, the data memory location may be comprised, for example, of ferroelectric material.

Figures 2A, 2B:
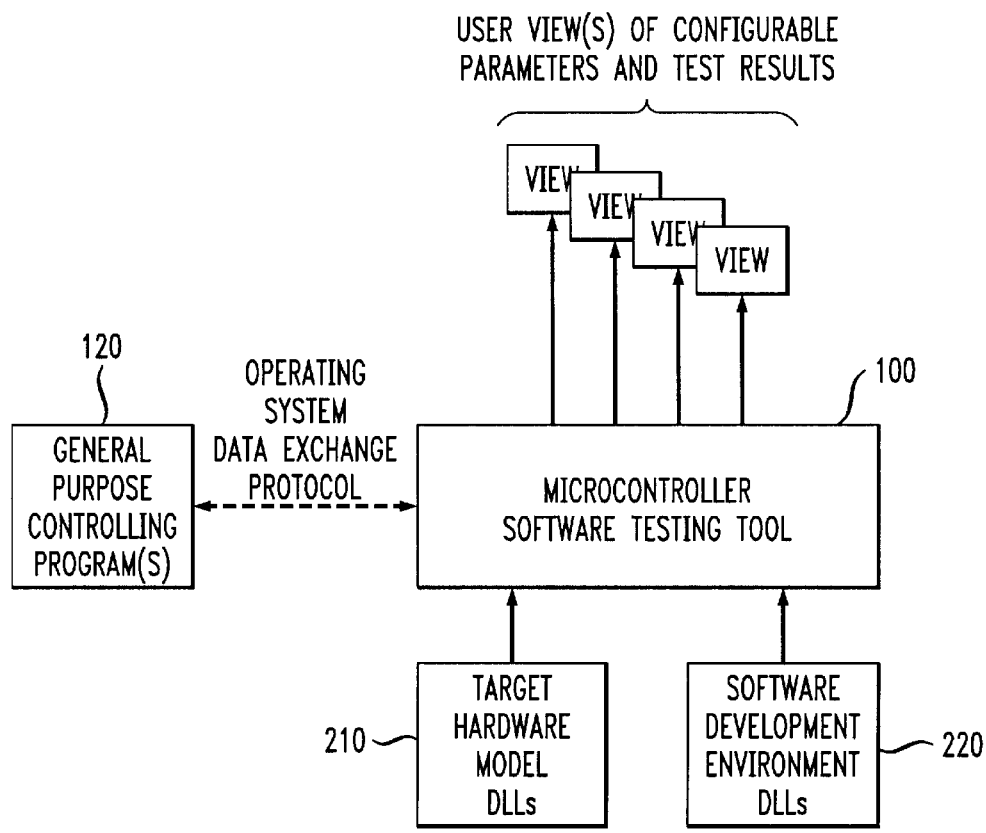

As shown in FIG. 2A, each microcontroller variant (target hardware) is preferably implemented as a DLL 210, discussed further below in conjunction with FIGS. 2B and 2C. Likewise, each software development environment 110 variant is preferably implemented as a DLL 220, discussed further below in conjunction with FIG. 2D. The DLL 210 contains all microcontroller specific information, such as the core instruction decoding (instruction set) and hardware characteristics. In this manner, the simulator interface presented by the microcontroller software testing tool 100 to a user is essentially the same regardless of the actual microcontroller being simulated, or in fact, whether the device is being simulated or emulated.

As shown in FIG. 2A, and discussed further below in conjunction with FIGS. 2E through 2H, respectively, the microcontroller software testing tool 100 preferably supplies several views of the simulation environment, allowing the user to (i) monitor and edit the microcontroller's memory, (ii) monitor and edit the microcontroller's registers, (iii) view and edit the source code or corresponding assembly language for the current program position, and (iv) monitor the values transmitted on each of the ports of the target hardware.

As discussed above, the microcontroller software testing tool 100 provides a modular configuration. Thus, the user must specify the selected hardware configuration and software development environment. The microcontroller software testing tool 100 utilizes the specified hardware configuration to select the appropriate target hardware model DLL 210, shown in FIGS. 2B and 2C. In one preferred embodiment, the user can also specify the pseudo-frequency for the microcontroller software debugging tool 100. In this manner, it is possible to accurately calculate the actual timing of events within the target device and at its external interfaces even when the master clock is changed.

If the microcontroller software testing tool 100 is in a simulation mode, the user specification of the selected hardware configuration will cause the microcontroller software testing tool 100 to load the DLL 210 of the target hardware containing the appropriate instruction set and hardware specific information. In an emulation mode, the user specification of the selected hardware configuration will cause the microcontroller software testing tool 100 to store the software program being tested in the emulator hardware 410 (FIG. 1B) and to establish the appropriate communication channels between the microcontroller software testing tool 100 and the emulator hardware 410.

As shown in FIGS. 2B and 2C, the hardware specific DLL 210 may be conceptually represented as a set of tables. Specifically, the hardware specific DLL 210 includes an instruction set look up table and hardware characteristics tables. The instruction set look up table, shown in FIG. 2B, maintains a plurality of records, such as records 230–238, each corresponding to a different hexadecimal value in the instruction set. For each hexadecimal value in field 240, the instruction set look up table includes the corresponding mnemonic in field 242, as well as the number of additional bytes associated with the instruction and the time to execute the instruction in fields 244 and 246, respectively. In accordance with the present invention, the time to execute the instruction recorded in field 246 includes instruction execution time, as well as hardware dependencies, including memory access times.

In addition to a unique instruction set, each microcontroller variant has unique hardware characteristics, including the number of registers and their size. Thus, a register table, shown in FIG. 2C, maintains a plurality of records, such as records 250–256, each corresponding to a different register on the microcontroller variant. For each register identified in field 260, the register table indicates the physical location of the register in memory.

Finally, the DLL 210 preferably includes a table with a set of records 270–276, each associated with additional hardware characteristics of the microcontroller variant. For example, the table preferably records any required information on address mapping hardware, as well as information relating to memory characteristics.

The microcontroller software testing tool 100 utilizes the software development environment 110 specified by the user to select the appropriate software development environment DLL 220, to produce a set of tables shown in FIG. 2D. Generally, the tables set forth in FIG. 2D indicate where the microcontroller software testing tool 100 should find the software program being tested, as well as related debugging information, if any, provided by the software development environment 110. The DLL 220 preferably specifies how the microcontroller software testing tool 100 interfaces to the software program being tested. For example, the DLL 220 can define the filepath defining the file containing the software program.

In addition, the software development environment DLL 220 can specify how the software program being tested and any related debugging information file are formatted. In other words, the software development environment DLL 220 can specify the file type associated with the software program, such as straight binary, Intel Hex, Motorola S-Record or Intel AOMF. It is noted that some software development tools generate separate program and debug files, while other software development tools generate an integrated file, such as those producing an AOMF format.

The DLL 220 performs three main tasks to create the data files shown in FIG. 2D: (i) importing and managing locator information; (ii) importing symbols from the program; and (iii) converting between source coordinates, such as source filename and line number, and physical memory addresses.

As shown in FIG. 2E, the hexadecimal values stored in the code memory, or internal or external data memory may be monitored and edited in a memory view 295, with those memory locations which have been read from or written to preferably distinguished from those memory locations which have not been read from or written to, for example, with high-lighted text. The memory values can be edited directly from the memory view 295, and break points can be inserted at desired code memory locations to break on an instruction or at a desired data memory location when data is read from or written to the associated data location. Thus, in both a simulator and an emulator mode, the operator can set breakpoints to monitor program execution. The microcontroller software testing tool 100 can permit viewing and editing of existing active break points and creation of new break points.

Figure 2F:
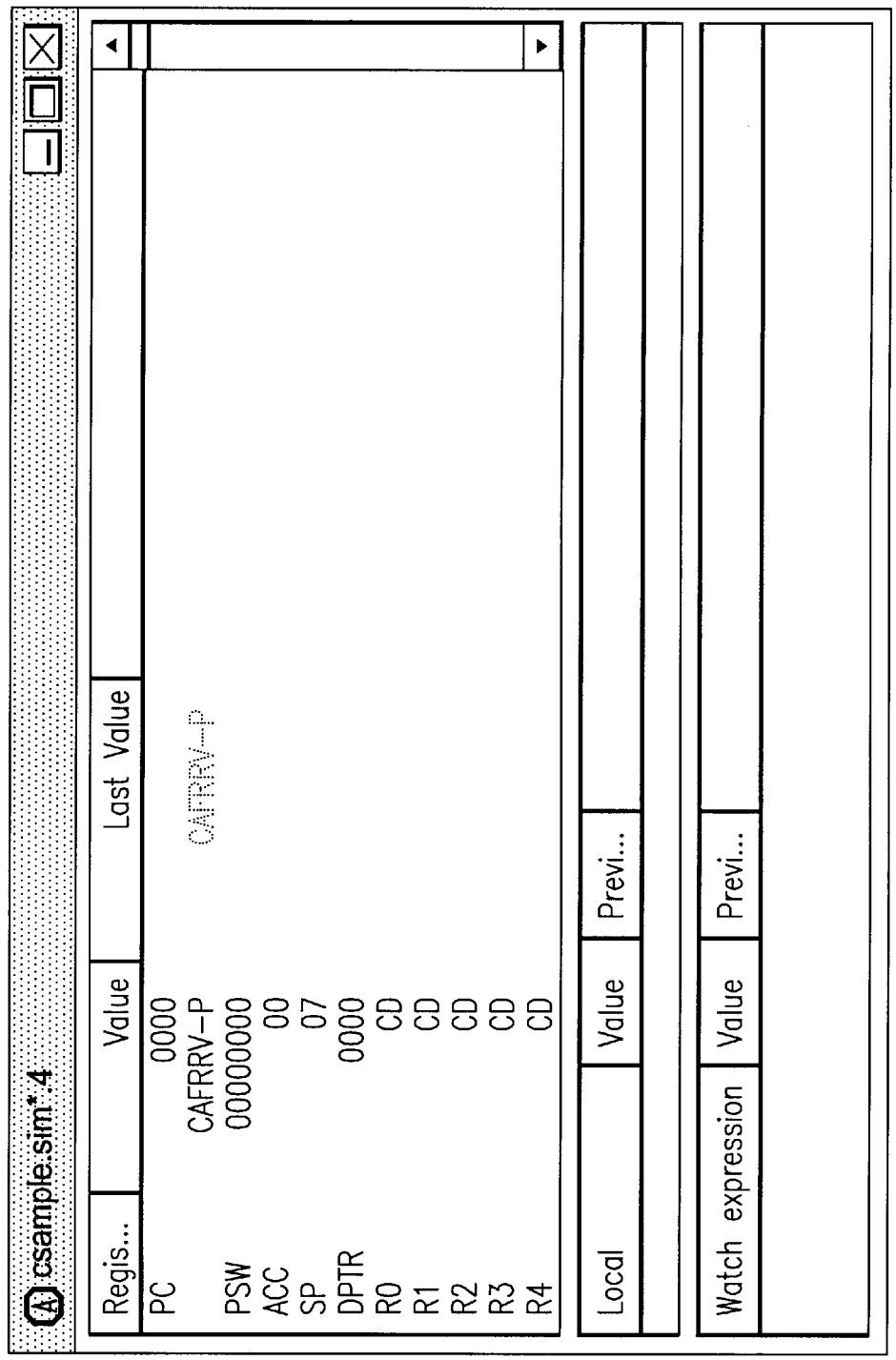

As shown in FIG. 2F, the microcontroller registers may be monitored and edited in a register view 296, with those registers having a changed value preferably distinguished from those registers having unchanged values, for example, with high-lighted text. In one embodiment, the register view 296 can present the current and previous register values. Since a register is merely a physical location in the microcontroller's random access memory (RAM), the register information presented in the register view 296 is preferably tied to the corresponding memory information presented in the memory view 295. The relationship between each register and the corresponding physical location in the microcontroller's RAM is specified in the target hardware model DLL 210.

As shown in FIG. 2G, the assembly language corresponding to the object code being tested may be viewed and edited in a disassembly view 297. The microcontroller software testing tool 100 preferably decodes the hexadecimal values stored in the code memory, using the Instruction Set look-up table shown in FIG. 2B., to produce the assembly language version of the software program. Alternatively, the assembly language version of the software may be provided by the software development environment 110. As discussed above in conjunction with FIG. 2D, the debug information received from the software development environment 110 is used to translate between locations in the binary object code being executed and the corresponding locations in the source code or assembly language.

As shown in FIG. 2H, the characters transmitted or received on any port of the microcontroller are preferably presented in a terminal view 298. To permit the microcontroller software testing tool 100 to simulate a specific terminal or visual display unit (VDU), the user can preferably specify whether (i) outgoing characters should be echoed in the terminal window; (ii) to add a line feed character to each incoming or outgoing carriage return; (iii) carriage return and line feed characters should be interpreted as formatting control codes or raw data; and (iv) characters should be shown in a two-digit hex format instead of a single character.

As previously indicated, the simulator 300, shown in FIG. 3, simulates the execution of the software program on the target hardware. Thus, the microcontroller software testing tool 100 executes a core simulation process 700, discussed below in conjunction with FIGS. 7A and 7B, to interpret the object code values and behave like the target hardware. As shown in FIG. 3, and discussed further below in conjunction with FIG. 7A, the microcontroller software testing tool 100 receives a compiled object code file from the software development environment 110. Once the user has specified the software development environment 110 variant, the appropriate software development environment DLL 220 will be loaded into the microcontroller software testing tool 100 so that the microcontroller software testing tool 100 can find the software program being tested, as well as any related debugging information provided by the software development environment 110, and can extract the appropriate information therefrom to load the files into memory, using the file formatting information contained in the DLL 220.

Likewise, once the user has specified the microcontroller variant, the appropriate hardware model DLL 210 will be loaded into the microcontroller software testing tool 100 so that the microcontroller software testing tool 100 can properly decode the object code values, using the instruction set look-up table set forth in FIG. 2B, and will otherwise behave like the target hardware.

As previously indicated, the emulator interface 400, shown in FIG. 4, provides access to the emulator hardware 410; allows emulation of different semiconductor devices using the same microcontroller software testing tool 100; permits emulation before silicon exists and utilizes the same high definition language specification, such as VHDL models, that defines the silicon during the fabrication process. Generally, the microcontroller software testing tool 100 can emulate any semiconductor circuit that has a high definition language specification available, such as a VHDL file.

Again, the microcontroller software testing tool 100 receives a compiled object code file from the software development environment 110. In an emulation mode, the compiled object code file is loaded into the memory 420 of the emulator hardware 410. According to a feature of the present invention, the compiled object code file will run on a field programmable gate array (FPGA) device 415 which has been loaded with the high definition language specification, such as a VHDL model 430, of the microcontroller variant. High definition language specifications for most core microcontroller variants are commercially available from a number of sources, including Mentor Graphics Corp. of Warren, N.J. and Synopsis, Inc. of Austin, Tex. Manufacturer-specific variations to the core architecture are then added to the VHDL model, in a known manner. For example, the 8051 microcontroller produced by Advanced Technology Materials, Inc. of Danbury, Conn. does not use parallel ports, although parallel ports are supported by the core 8051 architecture. A FPGA translator 440 translates the VHDL model 430, in a known manner.

In this manner, the software can be tested on the emulator hardware 410 before the final silicon product is available. The cost of producing a field programmable gate array (FPGA) device 415 loaded with the high definition language specification of the microcontroller variant is approximately $100.00, as opposed to over $250,000.00 for producing the first silicon chip. Thus, the microcontroller software testing tool 100 allows emulation of different semiconductor devices using the same microcontroller software testing tool 100; permits emulation before silicon exists and utilizes the same high definition language specification, such as VHDL models, that define the silicon during the fabrication process.

Figure 5:
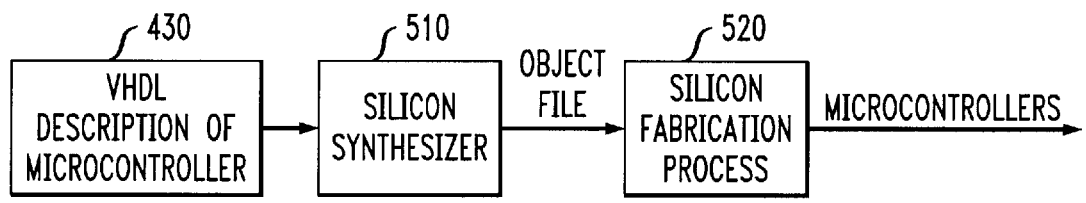
FIG. 5 illustrates the relationship between the VHDL description of FIG. 4 and the semiconductor fabrication process.

FIG. 5 illustrates the relationship between the VHDL model 430 of FIG. 4 and the semiconductor fabrication process 520 that produces the actual silicon microcontrollers.

Processes

Figure 6:
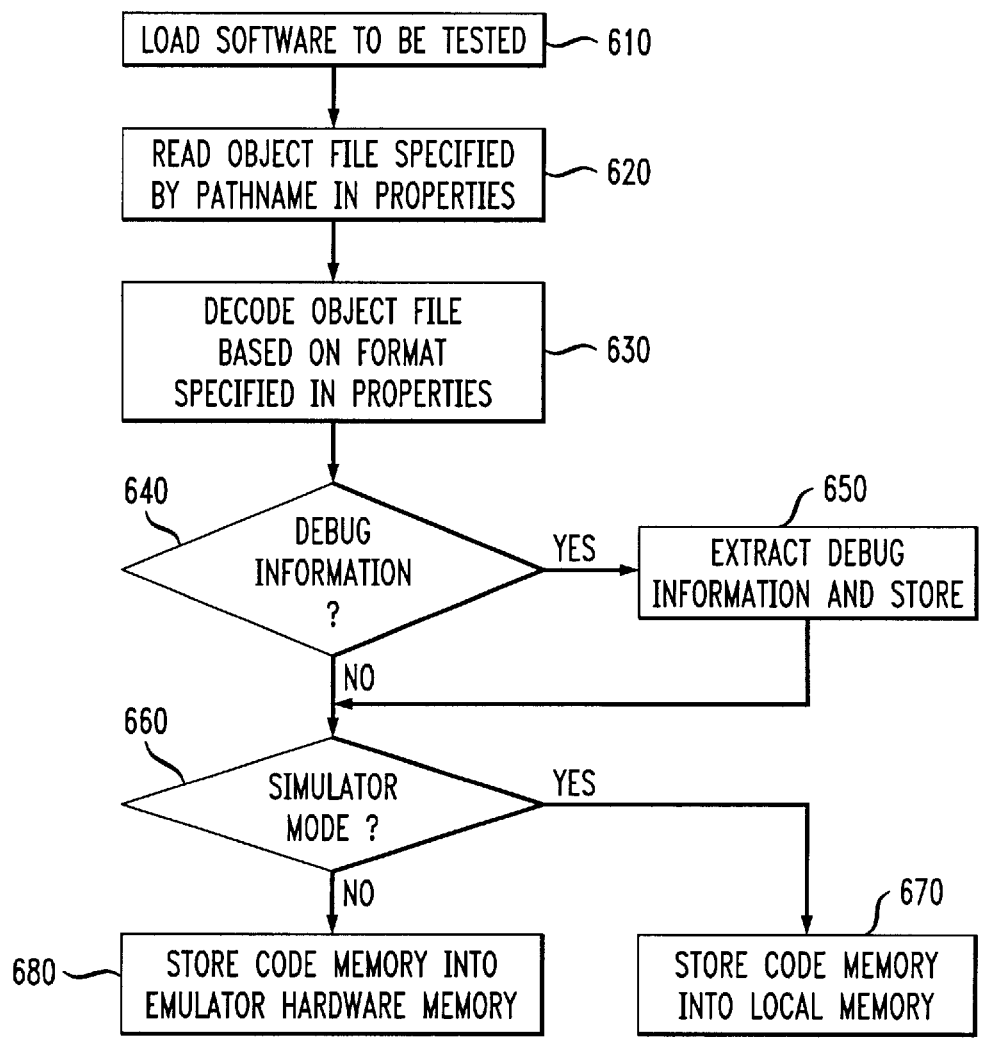
FIG. 6 is a flowchart describing an exemplary load process as implemented by the microcontroller software testing tool of FIG. 1B to load the software to be tested.

As shown in FIG. 6, the microcontroller software testing tool 100 initially loads the software to be tested during step 610. Thereafter, the object file specified by the pathname in the user-defined properties is read during step 620. The object file is then decoded during step 630, based on the format specified in the user-defined properties. A test is then performed during step 640 to determine if any debugging information has been provided by the software development environment 110.

If it is determined during step 640 that debugging information has been provided by the software development environment 110, then the debugging information is extracted during step 650 before program control proceeds to step 660. A test is then performed during step 660 to determine if the microcontroller software testing tool 100 is in a simulation mode or an emulation mode. If it is determined during step 660 that the microcontroller software testing tool 100 is in a simulator mode, the software code to be tested is stored in local memory of the microcontroller software testing tool 100. If, however, it is determined during step 660 that the microcontroller software testing tool 100 is in an emulation mode, the software code to be tested is stored in memory 420 of the emulator hardware 410.

Figure 7A:
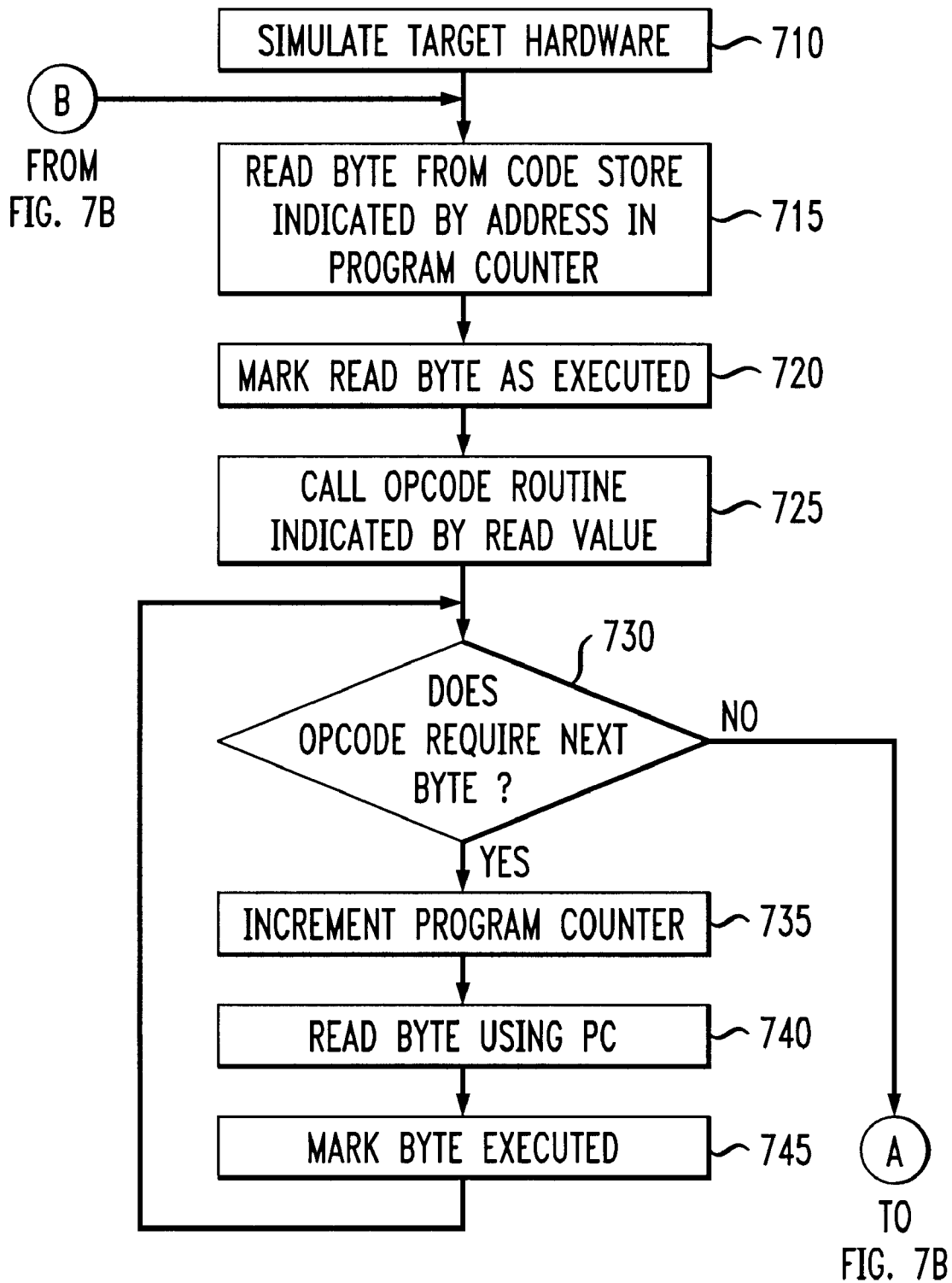
FIGS. 7A and 7B, collectively, are a flowchart describing an exemplary simulation process as implemented by the microcontroller software testing tool of FIG. 1B to simulate the execution of the software program being tested on the target hardware.

As shown in FIG. 7A, during a simulation mode, the microcontroller software testing tool 100 will initially simulate the target hardware during step 710 by loading the appropriate target hardware model DLL 210. Thereafter, the microcontroller software testing tool 100 will read a byte of the software from the code store during step 715, indicated by the address in the program counter, in a known manner. The simulation program will then mark the read byte as having been executed during step 720.

It is noted that many microprocessors being simulated, such as the 8051 microcontroller, are 8-bit devices. In addition, currently available general purpose computing devices suitable for hosting the microcontroller software testing tool 100 typically include a 32-bit processor, such as the Pentium II from Intel. Thus, 24 bits are available on the microcontroller software testing tool 100 for each byte on the target hardware. As discussed further below, these additional bits can be used, i.e., for setting flags for monitoring each byte. Thus, when the read byte is marked as having been executed during step 720, one of the 24 additional bits can be set as a flag.

Thereafter, the instruction set look-up table (FIG. 2B) is accessed during step 725 to call the appropriate opcode routine indicated by the byte value read during step 715. A test is then performed during step 730 to determine if the current opcode requires the next byte. If it is determined during step 730 that the current opcode does require the next byte, then the program counter is incremented during step 735. Thereafter, the next byte is read using the program counter during step 740 and the byte is marked as having been executed during step 745.

Figure 7B:
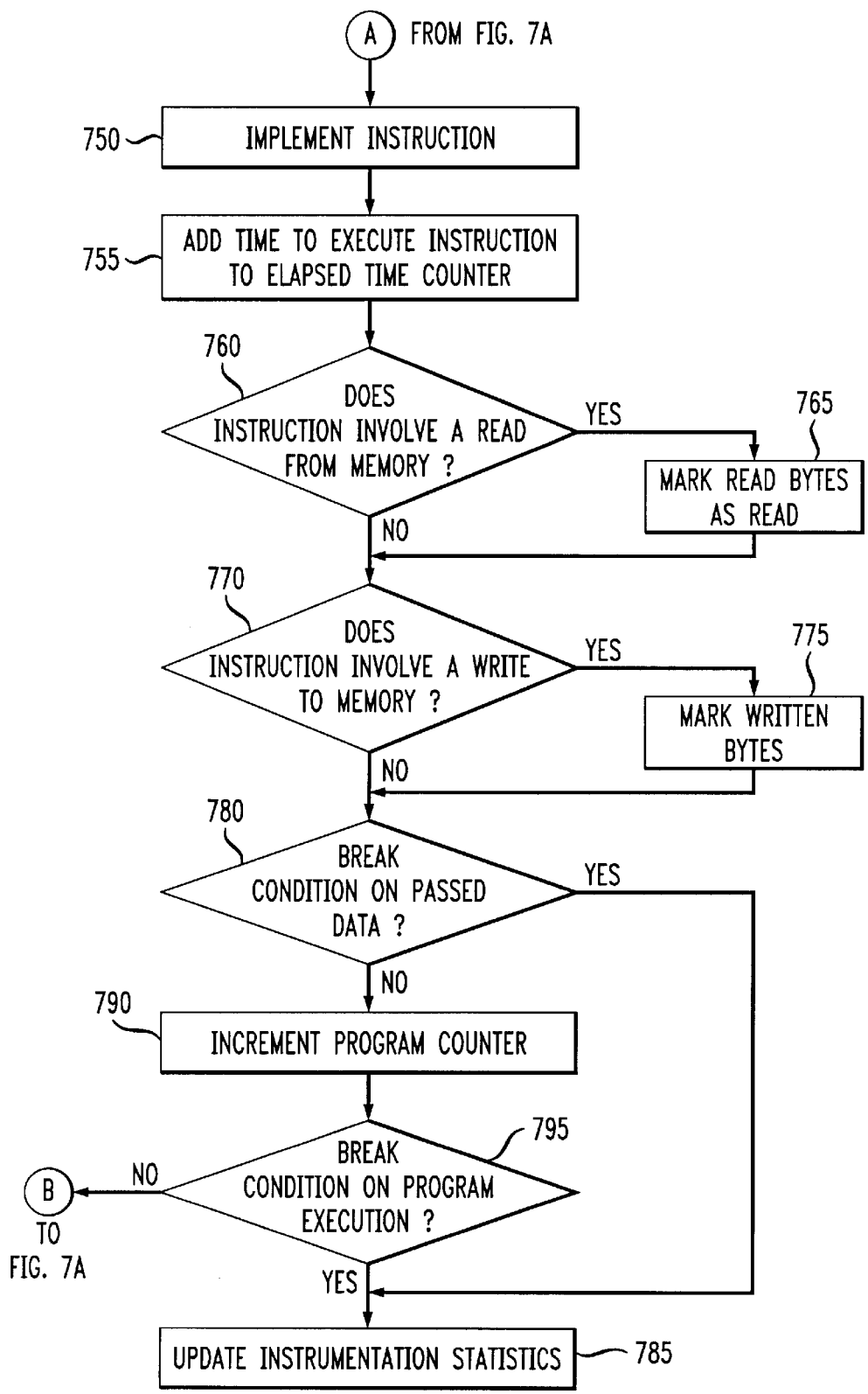

If, however, it is determined during step 730 that the current opcode does require the next byte, then the instruction is implemented during step 750 (FIG. 7B). In addition, the amount of time to execute the instruction, as retrieved from field 246 of the instruction set look-up table (FIG. 2B), is preferably added to an elapsed time counter during step 755. In this manner, the microcontroller software testing tool 100 can report timing of code execution to permit tuning of algorithms, taking into account configuration of the microcontroller and peripherals. Thus, the elapsed time counter indicates the total amount of pseudo-time passed in the simulator 100 since the last reset or since the last halt.

A test is performed during step 760 to determine if the instruction involves a read from memory. If it is determined during step 760 that the instruction does involve a read from memory, then a flag is set for each read byte during step 765, indicating that the bytes have been read.

A test is performed during step 770 to determine if the instruction involves a write to memory. If it is determined during step 770 that the instruction does involve a write to memory, then a flag is set for each written byte during step 775, indicating that the bytes have been written to.

A test is then performed during step 780 to determine if there is a break condition on the passing of data. If it is determined during step 780 that there is a break condition on the passing of data, then program execution is paused during step 785 and the code coverage instrumentation statistics are updated, as discussed below. If, however, it is determined during step 780 that there is not a break condition on the passing of data, then the program counter is incremented during step 790 before a further test is performed during step 790 to determine if there is a break condition on program execution. Since break condition must be placed at the instruction level, the microcontroller software testing tool 100 provides instruction granularity, with atomic instructions.

If it is determined during step 790 that there is a break condition on program execution, then program execution is paused during step 785 and the code coverage instrumentation statistics are updated, as discussed below. If, however, it is determined during step 790 that there is not a break condition on program execution, then program control returns to step 715 (FIG. 7A) and continues in the manner discussed above.

As previously indicated, instrumentation statistics are updated during step 785. According to a feature of the present invention, the microcontroller software testing tool 100 monitors the percentage of the code that was executed during testing. In one embodiment, the code coverage instrumentation reports and displays the code coverage, by indicating whether or not each portion of the software has been executed and tested. Thus, during step 785, the microcontroller software testing tool 100 uses the flags set during steps 720 and 745 to determine the percentage of the code that was executed by the software test. In addition, the microcontroller software testing tool 100 can use the flags set during steps 765 and 775 to adjust the memory view 295 (FIG. 2E) to distinguish data memory locations that were either read or written from memory locations that were not accessed.

It is noted that while FIGS. 7A and 7B illustrate the microcontroller software testing tool 100 in a simulation mode, the microcontroller software testing tool 100 performs the same tasks in an emulator mode. For example, break points can be achieved in the emulator hardware 410 by utilizing a set of registers and one or more comparators to determine if the address or data match a specified break condition.

It is to be understood that the embodiments and variations shown and described herein are merely illustrative of the principles of this invention and that various modifications may be implemented by those skilled in the art without departing from the scope and spirit of the invention.

What is claimed is:

1. A method of testing software for a semiconductor circuit, said method comprising the steps of:

simulating said semiconductor circuit including memory characteristics of said semiconductor circuit on a general purpose computing device;

executing said software on said simulated semiconductor circuit;

monitoring the estimated time to execute said software including hardware related timing on said semiconductor circuit such that said simulated execution of said software maintains timing considerations with an actual execution of said software on said semiconductor circuit; and evaluating the operation of said software.

2. The method according to claim 1, wherein said simulating step includes the step of decoding instructions in said software using an instruction set of said semiconductor circuit.

3. The method according to claim 1, wherein said simulating step includes the step of behaving like said semiconductor circuit.

4. The method according to claim 1, wherein said estimated time includes the time to execute each instruction as well as hardware access times.

5. The method according to claim 1, further comprising the step of determining the percentage of said software that is executed during said executing step.

6. The method according to claim 1, further comprising the step of determining data memory locations that are read.

7. The method according to claim 6, wherein said data memory locations are comprised of ferroelectric material.

8. The method according to claim 1, further comprising the step of determining data memory locations that are written to.

9. The method according to claim 8, wherein said data memory locations are comprised of ferroelectric material.

10. The method according to claim 9, further comprising the step of recording said results in a standard document.

11. The method according to claim 1, further comprising the step of initiating said method from a general-purpose program using a data exchange protocol.

12. The method according to claim 1, further comprising the step of interrogating said method for results from a general-purpose program using a data exchange protocol.

13. A method of testing software for a semiconductor circuit, said method comprising the steps of:

programming a field programmable gate array with a hardware description language description of said semiconductor circuit including memory characteristics of said semiconductor circuit;

emulating said semiconductor circuit using said programmed field programmable gate array;

executing said software on said emulated semiconductor circuit, wherein each instruction of said software is executed sequentially on said emulated semiconductor circuit in accordance with a clock that is a rational factor of a clock on said semiconductor circuit; and evaluating the accuracy of said software.

14. The method according to claim 13, further comprising the step of initiating said method from a general-purpose program using a data exchange protocol.

15. The method according to claim 13, further comprising the step of interrogating said method for results from a general-purpose program using a data exchange protocol.

16. The method according to claim 15, further comprising the step of recording said results in a standard document.

17. A tool for testing software for a semiconductor circuit, comprising:

a software model of said semiconductor circuit, said software model including memory characteristics of said semiconductor circuit;

a processor for executing said software using said software model of said semiconductor circuit;

a counter for monitoring the estimated time to execute said software including hardware related timing on said semiconductor circuit such that said simulated execution of said software maintains timing considerations with an actual execution of said software on said semiconductor circuit; and means for evaluating the operation of said software.

18. The software testing tool according to claim 17, further comprising an instruction set of said semiconductor circuit for decoding instructions in said software.

19. The software testing tool according to claim 17, wherein said testing tool behaves like said semiconductor circuit.

20. The software testing tool according to claim 18, wherein said estimated time includes the time to execute each instruction as well as hardware access times.

21. The software testing tool according to claim 17, wherein said processor determines the percentage of said software that is executed.

22. The software testing tool according to claim 17, wherein said processor determines data memory locations that are read.

23. The software testing tool according to claim 22, wherein said data memory locations are comprised of ferroelectric material.

24. The software testing tool according to claim 17, wherein said processor determines data memory locations that are written to.

25. The software testing tool according to claim 24, wherein said data memory locations are comprised of ferroelectric material.

26. The software testing tool according to claim 17, further comprising a data exchange protocol for communicating with general-purpose programs.

27. The software testing tool according to claim 26, further comprising means for initiating said software testing tool based on a command received from a general-purpose program.

28. The software testing tool according to claim 26, further comprising means for providing results to a general-purpose program using a data exchange protocol.

29. A tool for testing software for a semiconductor circuit, comprising:

an emulator comprised of a field programmable gate array programmed with a hardware description language description of said semiconductor circuit including memory characteristics of said semiconductor circuit;

a processor for controlling instruction of said software on said emulated semiconductor circuit, wherein each instruction of said software is executed sequentially on said emulated semiconductor circuit in accordance with a clock that is a rational factor of a clock on said semiconductor circuit; and means for evaluating the accuracy of said software.

30. The software testing tool according to claim 29, further comprising a data exchange protocol for communicating with general-purpose programs.

31. The software testing tool according to claim 30, further comprising means for initiating said software testing tool based on a command received from a general-purpose program.

32. The software testing tool according to claim 29, further comprising means for providing results to a general-purpose program using a data exchange protocol.

33. A method of testing software for a semiconductor circuit, said method comprising the steps of:

simulating said semiconductor circuit including memory characteristics of said semiconductor circuit on a general purpose computing device;

executing said software on said simulated semiconductor circuit;

monitoring the estimated time to execute said software including hardware related timing on said semiconductor circuit such that said simulated execution of said software maintains timing considerations with an actual execution of said software on said semiconductor circuit; and determining the percentage of said software that is executed during said executing step.

34. The method according to claim 33, further comprising the step of indicating portions of said software that are not executed.

35. The method according to claim 33, wherein said determining step does not alter said software.

36. The method according to claim 33, wherein said determining step evaluates an assembly language version of said software.

37. The method according to claim 33, wherein said determining step sets a flag upon executing each byte of memory storing said software.

* * * * *

UNITED STATES PATENT AND TRADEMARK OFFICE
CERTIFICATE OF CORRECTION

PATENT NO. : 6,223,144 B1
DATED : April 24, 2001
INVENTOR(S) : Philip Barnett, Andy Green et al.

It is certified that error appears in the above-identified patent and that said Letters Patent is hereby corrected as shown below:

<u>Title page,</u>
Insert: Item [56], References Cited

U.S. PATENT DOCUMENTS

| | | | |
|---|---|---|---|
| 4,674,089 | * 6/1987 | Poret | 714/28 |
| 5,640,337 | * 6/1997 | Huang | 703/23 |
| 5,228,039 | * 7/1993 | Knoke | 714/28 |
| 5,604,888 | * 2/1997 | Kiani-Shabestari | 703/23 |
| 5,761,482 | * 6/1998 | Matsui | 703/23 |
| 4,847,805 | * 7/1989 | Ishii | 703/27 |
| 5,594,890 | * 1/1997 | Yamaura | 703/23 |
| 5,321,828 | * 6/1994 | Phillips | 703/28 |

Signed and Sealed this

Fifth Day of March, 2002

Attest:

JAMES E. ROGAN
*Attesting Officer*     *Director of the United States Patent and Trademark Office*